(12) United States Patent
Chang

(10) Patent No.: US 7,974,998 B1
(45) Date of Patent: Jul. 5, 2011

(54) TRACKBACK SPAM FILTERING SYSTEM AND METHOD

(75) Inventor: Allen Ming-Tai Chang, Xizhi (TW)

(73) Assignee: Trend Micro Incorporated, Tokyo (JP)

( * ) Notice: Subject to any disclaimer, the term of this patent is extended or adjusted under 35 U.S.C. 154(b) by 1030 days.

(21) Appl. No.: 11/801,853

(22) Filed: May 11, 2007

(51) Int. Cl.
*G06F 15/16* (2006.01)

(52) U.S. Cl. .................. 709/201; 709/224; 709/204

(58) Field of Classification Search .................. 709/204, 709/207, 224
See application file for complete search history.

(56) References Cited

U.S. PATENT DOCUMENTS

| | | | |
|---|---|---|---|
| 6,546,387 B1 * | 4/2003 | Triggs | 1/1 |
| 2005/0055400 A1 * | 3/2005 | Goutard et al. | 709/203 |
| 2005/0131750 A1 | 6/2005 | Kogan et al. | |
| 2005/0132048 A1 | 6/2005 | Kogan et al. | |
| 2005/0198021 A1 | 9/2005 | Wilcox et al. | |
| 2006/0242238 A1 | 10/2006 | Issa | |
| 2006/0271859 A1 | 11/2006 | Gorzela | |
| 2006/0284744 A1 | 12/2006 | Shotland | |
| 2007/0016689 A1 | 1/2007 | Birch | |
| 2007/0038646 A1 * | 2/2007 | Thota | 707/100 |
| 2007/0047844 A1 * | 3/2007 | Watanabe et al. | 382/305 |
| 2007/0078904 A1 | 4/2007 | Yoon et al. | |
| 2007/0078939 A1 * | 4/2007 | Kallen | 709/207 |
| 2007/0192127 A1 * | 8/2007 | McInnis | 705/1 |
| 2007/0214097 A1 * | 9/2007 | Parsons et al. | 706/12 |
| 2007/0255702 A1 * | 11/2007 | Orme | 707/5 |
| 2008/0071904 A1 * | 3/2008 | Schuba et al. | 709/224 |
| 2009/0282476 A1 * | 11/2009 | Nachenberg et al. | 726/22 |

OTHER PUBLICATIONS

Akismet-Comment Spam Killer; Published Oct. 25, 2005; http://boakes.org/akismet; Pertinent Sections: How it Works and Download & Installation.*

Six Apart; Developer Documentation: TrackBack Technical Specification, 2002-2004; http://www.sixapart.com/pronet/docs/trackback_spec.*

Sebastian Herp; Spam Karma 2 Akismet Plugin BETA; Oct. 31, 2005; http://www.sebbi.de/archives/2005/10/31/spam-karma-2-akismet-plugin-beta/.*

Gerecht, Paul et al.; Taking TrackBack Back (from Spam); May 31, 2006; http://seclab.cs.rice.edu/proj/trackback/papers/taking-trackback-back.pdf.*

TrackBack—Wikipedia, the free encyclopedia, pp. 1-2, [retieved on May 5, 2007]. Retrieved from the internet: <http://en.wikipedia.org/wiki/Trackback>.

Blog—Wikipedia, the free encyclopedia, pp. 1-12, [retrieved on May 5, 2007]. Retrieved from the internet: <http://en.wikipedia.org/wiki/Blog>.

(Continued)

*Primary Examiner* — John Follansbee
*Assistant Examiner* — Madhu Woolcock
(74) *Attorney, Agent, or Firm* — Okamoto & Benedicto LLP

(57) ABSTRACT

A blog website may register with a trackback spam filtering service to receive a trackback URL pointed to a computer of the track back spam filtering service. The trackback URL may be posted on the blog to allow readers to trackback to the blog. Trackback pings for linking to the blog may be received by the trackback spam filtering service for evaluation. The trackback spam filtering service may extract comment links from the trackback pings, and provide the comment links to a web reputation service to determine characteristics of the comment links. The trackback spam filtering service may consult a rules database that includes deterministic rules, heuristic rule, or both to determine if a comment link having particular characteristics is pointed to a spammer website. If so, the trackback spam filtering service may block the trackback to the blog.

7 Claims, 2 Drawing Sheets

OTHER PUBLICATIONS

Sping—Wikipedia, the free encyclopedia, p. 1, [retrieved on May 5, 2007]. Retrieved from the internet <http://en.wikipedia.org/wiki/Sping>.

Mattrackback—TrackBack Technical Specification, pp. 1-6, [retieved on May 5, 2007]. Retrieved from the internet:<http://www.movabletype.org/docs/mttrackback.html>.

* cited by examiner and claims.

TRACKBACK SPAM FILTERING SYSTEM AND METHOD

BACKGROUND OF THE INVENTION

1. Field of the Invention

The present invention relates generally to computer security, and more particularly but not exclusively to methods and apparatus for combating posting of trackback spam on web logs.

2. Description of the Background Art

Web logs, or simply "blogs," are web pages maintained by users for a variety of purposes including commentary, as an online diary, news publishing and so forth. Blog postings are typically displayed in a reverse chronological order. Some blogs allow readers to leave comments for display along with the blog. Trackback technology has been developed to allow bloggers to link back to a particular blog, thereby facilitating conversations spanning several blogs that readers can easily follow. Generally speaking, trackback is a form of acknowledgement that allows bloggers to know who has linked to their blog posting. A variety of blogging software follows a trackback protocol.

Although trackback facilitates web communication between bloggers and readers, trackback technology is susceptible to abuse by malicious individuals, collectively referred to herein as "spammers." Trackback allows spammers to leave links to websites containing "spam," which includes unwanted, unauthorized, fraudulent, or unrelated content. The spammer website may host not just unauthorized or inappropriate advertisements, but computer viruses as well. Trackback spam not only indirectly boosts search engine ranking of spammer websites but also adversely affects the reputation of the blogger and readers' interest in the blog site. Trackback spam has become too widespread that most bloggers disable trackback, which is unfortunate given the potential of trackback to enrich blogging. What is needed is an effective and easy to implement protective measure against trackback spam.

SUMMARY

In one embodiment, a blog website may register with a trackback spam filtering service to receive a trackback URL pointed to a computer of the track back spam filtering service. The trackback URL may be posted on the blog to allow readers to trackback to the blog. Trackback pings for linking to the blog may be received by the trackback spam filtering service for evaluation. The trackback spam filtering service may extract comment links from the trackback pings, and provide the comment links to a web reputation service to determine characteristics of the comment links. The trackback spam filtering service may consult a rules database that includes deterministic rules, heuristic rule, or both to determine if a comment link having particular characteristics is pointed to a spammer website. If so, the trackback spam filtering service may block the trackback to the blog.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
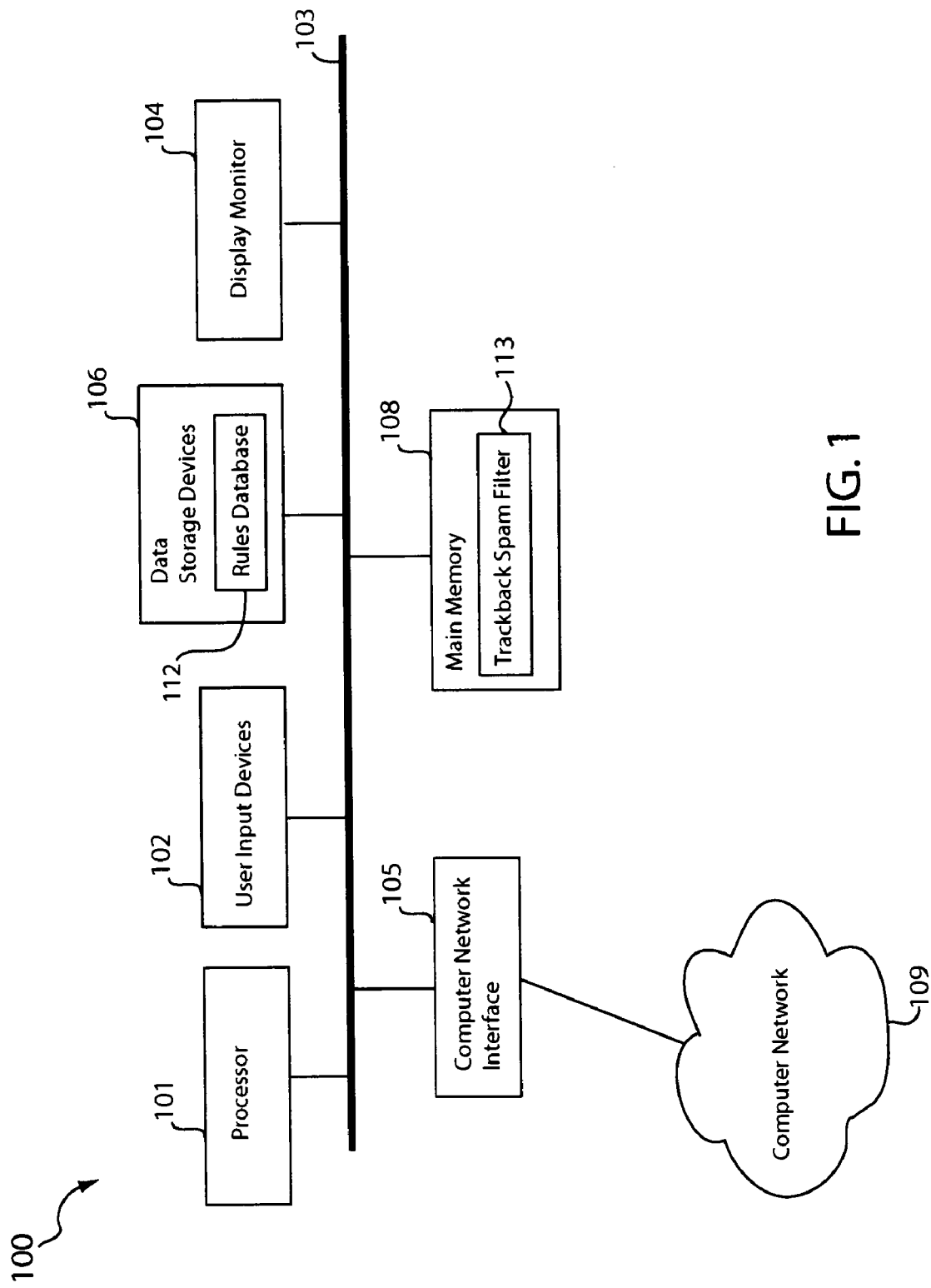
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed to implement a trackback spam filtering service, for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM).

In the example of FIG. 1, the main memory 108 includes a trackback spam filter 113. The trackback spam filter 113 may be loaded from the data storage device 106 to the main memory 108 for execution by the processor 101. Likewise, the data storage device 106 may store a rules database 112 that may be loaded into the main memory 108. The computer network interface 105 may be coupled to a computer network 109, which in this example includes the Internet.

The trackback spam filter 113 may comprise computer-readable program code for determining whether or not a network address being linked back to a blog posting using a trackback protocol is of a legitimate computer (e.g., not a spammer website). The network address may comprise a uniform resource identifier (URI), such as a uniform resource locator (URL) referred to as a trackback URL. In one embodiment, the trackback spam filter 113 is configured to provide a trackback URL for use by a blog website, receive a trackback ping to the trackback URL, extract a comment link from the trackback ping, determine characteristics of the comment link, and evaluate the characteristics of the comment link based on rules in the rules database 112 to determine whether or not the comment link is to a trackback spammer website.

In one embodiment, the trackback spam filter 113 determines characteristics of comment links by consulting a web reputation service. Generally speaking, a web reputation service gathers and maintains information about particular web sites on the Internet, including category, reputation score, credibility, and so on. Examples of web reputation services include those available from Trend Micro, Inc. and SenderBase of IronPort, Inc.

The rules database 112 may comprise heuristic rules, deterministic rules, or both for identifying trackback spammer websites. A heuristic rule may comprise a common-practice rule for automatically supporting filtering of comment links with or without facts or characteristics of the legitimate blog website being protected. On the other hand, a deterministic rule may comprise a blog-specific filtering rule defined or selected for a particular blog website being protected.

Examples of heuristic rules in the rules database 112 may include:
a) Comment links pointing to phishing sites are deemed trackback spam.
b) Comment links pointing to downloadable malicious codes or sites containing downloadable malicious codes are deemed trackback spam.

Examples of deterministic rules in the rules database 112 may include
a) If the category of the legitimate blog site is different from the comment link, the comment link is presumed to be trackback spam. This rule may be optimized to limit the categories of computers that may trackback to blogs of particular categories. For example, if the category of the legitimate blog is "music," comment links pointing to websites of the category "drugs," "porn," or other adult categories may be deemed a trackback spam.
b) Comment links having a reputation score below a certain benchmark score are deemed trackback spam.
c) Comment links from particular domains (e.g., domains in a white list) are deemed legitimate (i.e., not trackback spam).

Figure 2:
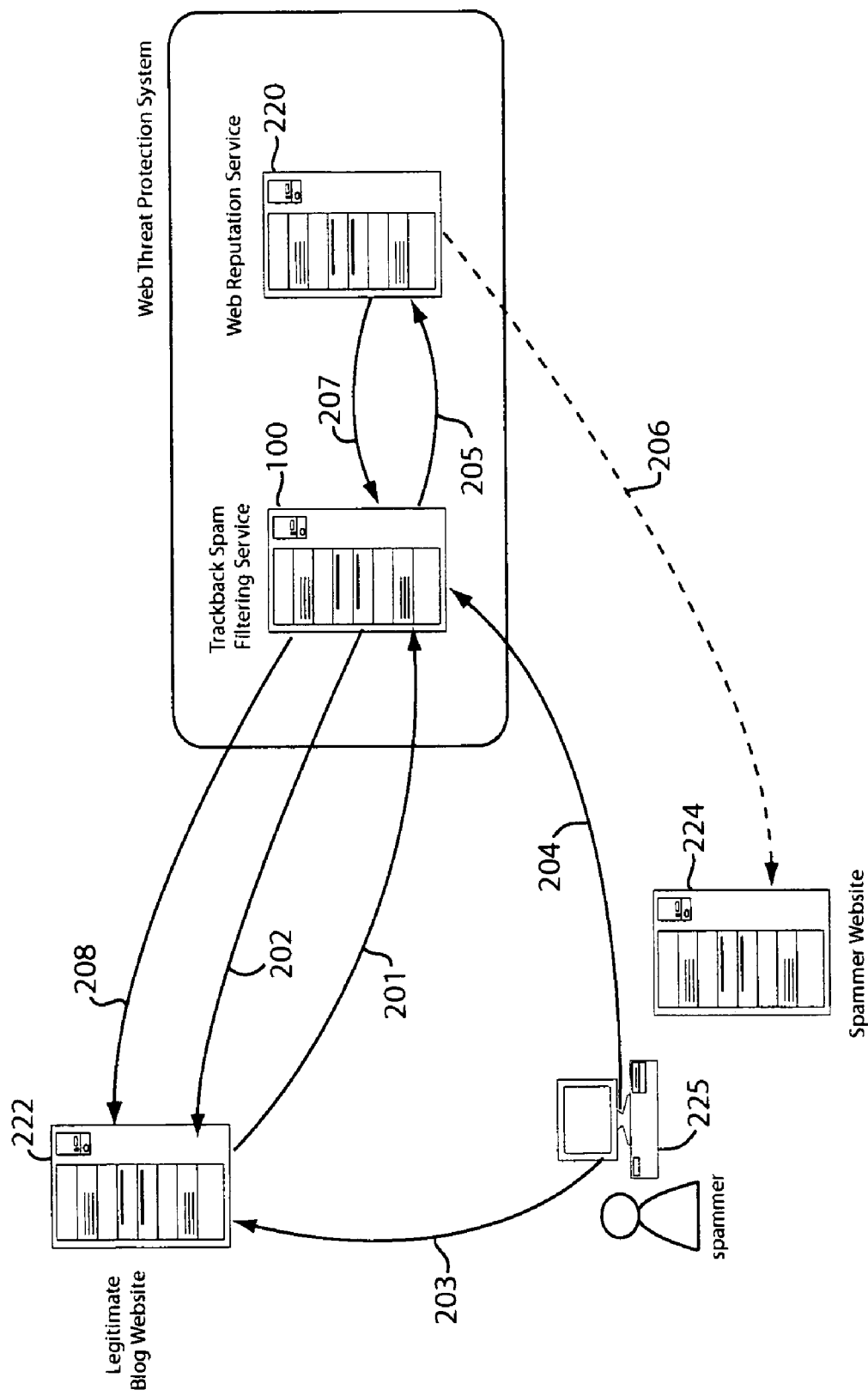
FIG. 2 schematically illustrates the operation of the computer of FIG. 1 in accordance with an embodiment of the present invention.

FIG. 2 schematically illustrates the operation of the computer 100 in accordance with an embodiment of the present invention. In the example of FIG. 2, the computer 100 is employed as trackback spam filtering service to be used in conjunction with a computer 200 that provides a web reputation service. The computers 100 and 200 may form a web threat protection system operated by a network security vendor, such as Trend Micro, Inc., for example. It is to be noted that computers 100 and 200 may also be separately operated by different network security vendors, and may be implemented in one or more computers. In the example of FIG. 2, the computers 100, 220, 222, 224, and 225 communicate over the Internet.

As a protective measure against trackback spam, a legitimate blog website hosted in a computer 222 may avail itself of the services of the trackback spam filtering service by registering with the trackback spam filter 113 in the computer 100 (arrow 201). In response, the trackback spam filter 113 provides a trackback URL to the legitimate blog website (arrow 202). The trackback URL points to the computer 100 to allow the trackback spam filter 113 to receive trackback pings from computers requesting to trackback to the blog in the legitimate blog website. The blogger makes the trackback URL available to readers who want to trackback to her blog. For example, the blogger may publish the trackback URL in a blog posting in the computer 222.

A spammer operating a computer 225 accesses the blog and retrieves the trackback URL to trackback to the blog (arrow 203). In accordance with the trackback protocol, the spammer sends a trackback ping using the trackback URL, which in this case points to the computer 100 (arrow 204). This advantageously diverts the trackback ping to another computer, the computer 100 in this example, for evaluation.

The trackback ping includes a comment link to allow readers of the blog to go to the site trackback linking to the blog. In the computer 100, the trackback spam filter 113 receives the trackback ping and extracts the comment link from the trackback ping. To determine characteristics of the comment link, the trackback spam filter 113 requests the web reputation service running in the computer 220 to provide information it has gathered about the computer pointed to by the comment link (arrow 205). In this case, the comment link points to a spammer website hosted in a computer 224. The web reputation service may retrieve from its database pre-existing information about the spammer website if such information is already available. Alternatively or in addition, the web reputation service may access the computer 224 (arrow 206) to learn of its characteristics in response to the request for information from the trackback spam filter 113.

The web reputation service provides information about the spammer website to the trackback spam filter 113 (arrow 207). Such information may include the spammer website's characteristics, such as its category, reputation score, and credibility. The category may be based on the subject category of the content of the spammer website. The reputation score is a value indicative of how good or legitimate a particular website is. For example, a reputation score may range from –10 to 10, with a reputation score of –10 indicating that the website is certainly malicious and a reputation score of 10 indicating that website is certainly a legitimate website. The credibility is an objective measurement of the believability or trustworthiness of websites. For example, a phishing site attacking eBay may be categorized as "online auction." However, since the phishing site is not actually operated for online auction, the creditability of the phishing site would be low.

The trackback spam filter 113 may apply the rules in the rules database 112 to the characteristics of the comment link to determine if the comment link points to a spammer website. For example, the legitimate blog website may provide its category to the trackback spam filter 113 as part of the registration process. A heuristic rule in the rules database 112 may guide the trackback spam filter 113 to compare the category of the computer pointed to by the comment link to the category of the legitimate blog website. As a particular example, the rule may inform the trackback spam filter 113 that "porn" is unrelated to "hiking." Therefore, if the category of the legitimate blog website is "hiking" and the comment link points to a computer having the category "porn" as indicated by the web reputation service, the trackback spam filter 113 may deem the comment link to be creating trackback spam. The trackback spam filter 113 may consult the rules in the rules database 112 and apply them in conjunction with information on the comment link provided by the web reputation service to determine if the comment link points to a spammer website and is thus an attempt to create a trackback spam.

The trackback spam filter 113 in the computer 100 may filter out comment links to spammer websites to prevent the spammer websites from trackback linking to the legitimate blog website. In that case, the trackback spam filter 113 may drop the trackback ping and, optionally, inform the legitimate blog website of its action (arrow 208). On the other hand, if a comment link has no indication of being pointed to a spammer website, based on information from the web reputation service and application of the rules in the rules database 112, the trackback spam filter 113 may forward the tracking ping to the legitimate blog website to allow the trackback to the blog.

The trackback spam filtering technique of the present invention provides advantages heretofore unrealized. Firstly, the technique may be employed with minimum changes to existing blog websites, allowing fore relatively simple integration. Secondly, the technique may be implemented in a centralized infrastructure, allowing several blog websites to share the cost of building and maintaining the infrastructure. Thirdly, because the technique is independent of a blog website, the technique may be implemented as an add-on service to be readily offered by existing network security vendors.

An effective trackback spam filtering system and method have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer implemented method of filtering trackback spam, the method comprising:

receiving a registration request from a fourth computer hosting a blog;

providing a trackback URL to the fourth computer in response to the registration request;

providing the trackback URL for posting on the blog hosted on the fourth computer, the trackback URL pointing to a first computer which is not hosting the blog, the first computer being configured to provide trackback spam filtering service;

receiving a trackback ping at the first computer, the trackback ping being from a second computer requesting to trackback to the blog, the trackback ping being received by way of the trackback URL posted on the blog;

extracting a comment link from the trackback ping;

forwarding the comment link to a third computer providing a web reputation service to obtain information about the comment link;

receiving information about the comment link, the information comprising characteristics of the comment link;

consulting a rules database to determine if the comment link is pointed to a spammer website based on the received information about the comment link; and preventing the trackback to the blog from occurring when the comment link is pointing to a spammer website.

2. The method of claim 1 wherein the rules database comprises deterministic rules, heuristic rules, or both.

3. The method of claim 1 wherein the information about the comment link includes a category of a website hosted by a fifth computer pointed to by the comment link.

4. The method of claim 3 wherein the comment link is deemed to be pointing to a spammer website when the website hosted by the fifth computer is of a particular category.

5. The method of claim 4 wherein the particular category is porn.

6. The method of claim 4 wherein the particular category is unrelated to a category of the website hosted by the fourth computer.

7. The method of claim 1 wherein the method is performed in the first computer.

* * * * *